Dec. 24, 1935.   H. E. ANDERSON   2,025,493
CAR TRUCK CONSTRUCTION
Filed April 14, 1933   2 Sheets-Sheet 1
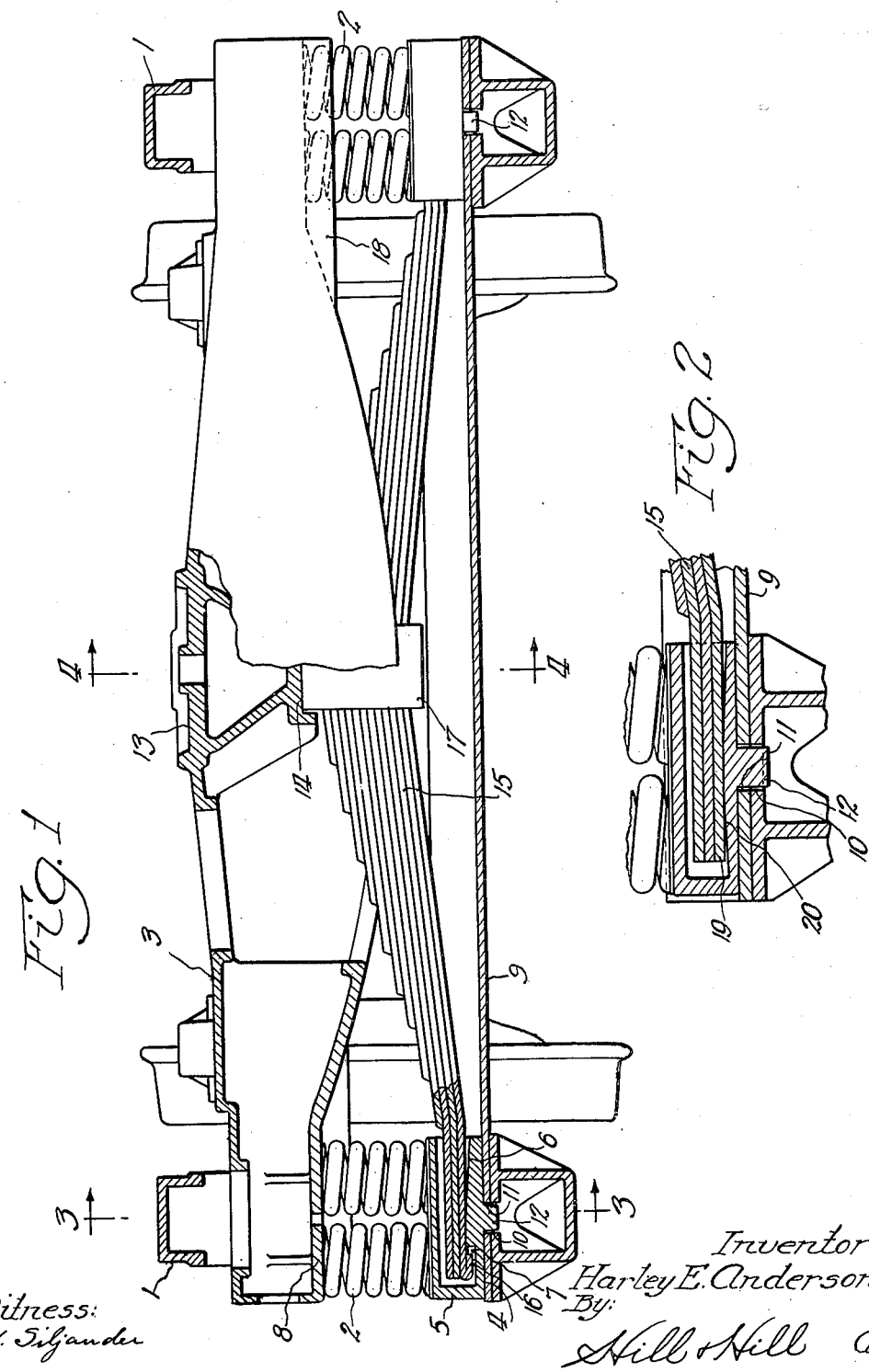
Inventor
Harley E. Anderson
By Hill & Hill   Attys.
Witness:
V. Silgander Dec. 24, 1935. H. E. ANDERSON 2,025,493
CAR TRUCK CONSTRUCTION
Filed April 14, 1933 2 Sheets-Sheet 2
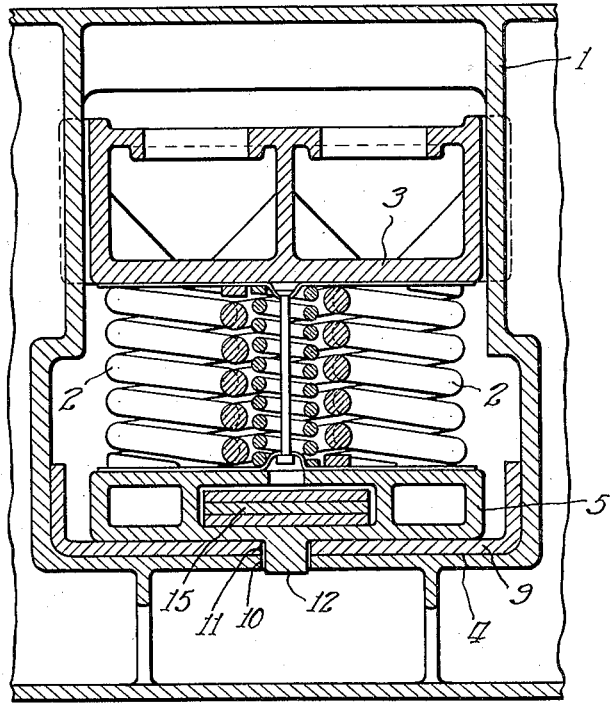
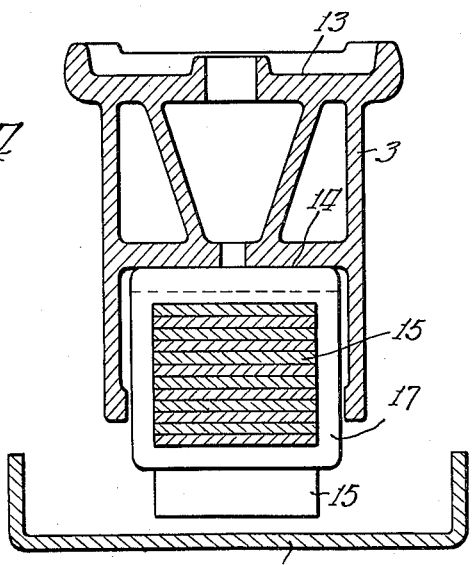
Inventor
Harley E. Anderson
By:
Hill & Hill Attys.
Witness:
V. Silgander Patented Dec. 24, 1935

2,025,493

UNITED STATES PATENT OFFICE 2,025,493

CAR TRUCK CONSTRUCTION

Harley E. Anderson, Chicago, Ill., assignor to John H. Sharp, Chicago, Ill.

Application April 14, 1933, Serial No. 666,151

7 Claims. (Cl. 105—197)

My invention belongs to that general class of devices known as car constructions and relates to a truck construction in which the truck is provided with additional spring capacity, at the same time affording a soft spring cushioning effect to absorb the vertical shocks and also add strength to the truck bolster at its weakest point.

The invention has among its objects the production of a construction of the kind described that does not depart from the present standards of railway car trucks as specified in American Railroad Association standards, which increases the spring capacity, increases the strength of the truck bolster and provides an improved resilient cushioning effect without weakening the truck side frames and without necessitating heavier castings for such changes as I make from standard practice in the construction of the truck. The present construction is particularly designed to afford a soft spring cushioning effect which will absorb the vertical shocks and protect the lading, particularly such as fresh berries, fruits and the like from damage due to the shocks and vibration caused by the wheels of the car going over the rails, rough track, frogs, crossing, high and low joints, etc. Tests have shown that the vertical movement transmitted to a car and its lading through the standard nest of coil springs commonly used (which vertical shocks are destructive to both car structure and its lading), amount to approximately fifty feet per mile.

The effect of this vertical impulse is naturally more severe when cushioned by the nest of coil springs alone than is the case with my invention where an additional semi-elliptical friction spring support is provided, and positioned as I show it to receive and cushion a part of these vertical impulses. Where full elliptical springs have heretofore been used in between the seats of coil springs, these may have to some extent increased the spring capacity, it is at the sacrifice of strength of the parts by requiring enlarged openings through the truck side frames; or on the other hand, specially designed side frames are necessary in some constructions. I differ from all previous designs in providing a semi-elliptical friction plate spring which may be used with or without a spring plank, tying the truck side frames together, and at the same time supporting the truck bolster at its weakest point, to-wit, the center.

My improved device is inexpensive in cost, easily installed, does not widely depart from standard construction practice, is efficient, practical and satisfactory.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawings, wherein like reference characters indicate like or corresponding parts;

Fig. 1 is a cross sectional view of a truck showing one embodiment of my invention; and including a spring plank which is not essential;

Fig. 2 is an enlarged sectional view of a portion of a slightly modified or simplified construction;

Fig. 3 is a sectional view taken substantially on line 3—3 of Fig. 1; and

Fig. 4 is a sectional view taken substantially on line 4—4 of Fig. 1.

Referring to the drawings, it may be mentioned that in Fig. 1 there is shown a construction in which the spring plank may be employed or not, as desired, the same not being essential, while in Fig. 2 a simplified construction is shown in which it is preferable to use a spring plank. In the embodiment of the invention shown in the drawings, 1 represents a truck side frame which follows standard practice, and need not be described in detail, and which is arranged to carry a truck bolster 3 supported by the springs 2 which are mounted on the spring seat 5 carried by the bottom support 4 of the truck frame. As shown, the spring seat 5 is recessed and provided with a rounded spring seat face 6 at the inner or open side, the outer side of the face being recessed as at 7 to form a shoulder. The bottom face 8 of the truck bolster is carried by the springs 2 as most clearly shown in Figs. 1 and 3. I have also shown a spring plank 9 which extends between the truck side frames and connects the same, it being understood, as more fully described hereinafter, that in the construction shown in Fig. 1 this spring plank may be omitted. The spring seat 5 is shown provided with a lug 12 which projects through the openings 10 and 11 in the spring plank and bottom support 4 of the side frame.

The bolster 3 is provided with a center plate 13 and with a recessed face 14 at the under side forming a seat for a spring band 17 which is arranged around the semi-elliptical friction springs 15. One or more of the leaves of the spring 15 project into the spring seats 5 at each end and the lowermost leaf is provided with a stop 16 arranged to engage the shoulder in the spring seat at the recessed portion 7 as required, so that regardless of the spring plank the truck frames are secured together through the spring 15 engaging the spring seat at either side of the truck.

As mentioned above, Fig. 1 shows a spring plank which is not essential in this construction but may be employed if desired. Where a spring plank is employed, as shown in Fig. 2, it is not necessary to form a stop in the end of the lower spring leaf at 19, but in this case I prefer to round the face 20 of the inner end of the recess in the spring seat substantially similar to the rounded face at the outer or open side of the recess.

The device is easily assembled by slipping the truck side frames 1 over the ends of the truck bolster 3, and the bolster is then raised to the top of the opening in the truck side frame and the semi-elliptical spring 15 is then slipped into its proper position with the spring band 17 located in its seat at 14. The spring is then compressed by binding the ends of the spring to the bolster by using two large U-bolts, chain jacks or any other suitable means. The spring seats 5 are then placed in position and next the coil spring clusters are set in place and the tension then removed from the semi-elliptical spring so that the spring construction ends are adjustably carried by the spring seats. When the weight of the car body is on the center plate 13 all of the parts are locked together and the distance from the center plate 13 to the top of the rail is correct and follows standard practice.

In the design of the bolster the bottom face 9 is raised up a distance equal to the thickness of the bottom spring seat 5 so that the standard coil springs may be used, but in this connection it will be noted that the side walls 18 at the ends of the bolster are not changed and therefore the vertical strength of the bolster is not in any way affected. The truck bolster conforms in every respect to the American Railroad Association requirements or standards and differs only by the spring seat 14 being formed in the bolster for the semi-elliptical spring and the bottom wall 8 being raised to permit the bottom spring seat 5 to be used. The side frame is not changed at all.

While I do change the design of the truck bolster to receive the semi-elliptical friction plate spring at the center, at the same time I strengthen the truck bolster by stronger design and by supporting the center portion of the truck bolster directly under the center plate where the weight is carried. I do this without affecting the material dimensions, such as the height from the top of the rail to the top of the bolster, or without affecting the dimensions where they enter through the truck side frame over the ends of the coil springs.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a car construction of the kind described and in combination, a pair of truck side frames provided with spring seats, each frame having an opening with a spring seat projected therein, springs carried by said seats, a truck bolster having its ends extended into and guided by the side walls of said openings and carried by said springs, and means connecting said truck spring seats and yieldingly supporting the bolster intermediate the ends thereof.

2. In a car construction of the kind described and in combination, a pair of spaced truck side frames each provided with an opening through the same constituting a spring-receiving space, a spring seat arranged in each opening at the bottom thereof and supported from the truck side frame thereat, coiled bolster springs arranged within each of said openings and carried by said spring seats, a truck bolster extending between the side frames with its ends positioned within said openings overlying and supported by said springs, each of said spring seats provided with a recess at the inner side thereof with a curved lower face at the interior, a spring construction consisting of a plurality of leaf springs and a spring band for securing the same together, one end of said spring construction positioned in the recess in one spring seat and the other positioned in the recess in the other spring seat, a spring plank arranged between the side frames with its ends positioned between the truck frame and spring seat at each side, said spring plank arranged to cooperate with the frame and spring seat and rigidly connect the two side frames, said bolster provided with a seat on the under side thereof constructed to receive the band of said spring construction whereby the bolster is supported by the spring construction at a point intermediate the ends below the center plate.

3. In a car construction of the kind described and in combination, a pair of truck side frames each provided with a spring opening through the side, spring seats arranged in said openings, coiled springs carried by said seats, a truck bolster extending between the side frames with its ends positioned within said openings and supported by said coiled springs, said bolster provided with a center plate intermediate its ends and with a spring seat at the under side immediately below said center plate, each of said spring seats provided with a recess at its inner side extending to the opposite side, a spring construction consisting of a plurality of semi-elliptical spring leaves having a securing band at the center binding the leaves together, one end of said spring construction positioned within the recess of one spring seat and adjustably carried thereby, the other end of said spring construction positioned in the recess of the other spring seat and adjustably carried thereby, said spring construction and band arranged to seat in said spring seat on the under side thereof and support the center of the bolster thereat.

4. A car spring construction of the kind described and in combination, comprising a semi-elliptical spring construction constituting a truck bolster supported and arranged intermediate its ends for engagement with the spring construction at the under side thereof, and side frame spring seats each constructed to fit the spring opening in the truck side frame, said spring seats provided with recesses and arranged to form seats for the ends of said spring construction.

5. A car spring construction of the kind described and in combination, comprising a semi-elliptical spring construction constituting a truck bolster supported and arranged intermediate its ends for engagement with the spring construction at the under side thereof, and side frame spring seats each constructed to fit the spring opening in the truck side frame, said spring seats provided with recesses arranged to form seats for the ends of said spring construction, and with means for securing the spring ends in the recesses.

6. In a spring construction for car trucks having side frames with openings therethrough, a bolster having its ends projected into and guided by the side walls of said openings and coiled bolster springs disposed below the bolster ends and carried by the side frames, the combination of a semi-elliptical spring construction made up of a plurality of leaves secured together and spring seat members constituting seats for the coiled bolster springs and for the ends of said semi-elliptical spring construction, the said spring seat members having recesses at the inner sides thereof formed with convex supporting faces at the bottom of the recesses for adjustably supporting the ends of said spring construction, and means for preventing accidental withdrawing of the spring ends from said recesses.

7. In a car construction of the kind described and in combination, a pair of spaced side frames, each having an opening through the same, a spring seat disposed in each opening and carried by said frame thereat, a bolster projected through said openings and having its ends of a width slightly less than the distance between the side walls of the openings whereby the side walls limit horizontal transverse movement of the bolster relative the frame and guide the same in its vertical travel, coiled springs interposed between said spring seats and bolster ends, and a semi-elliptical leaf spring construction having a plurality of spring leaves secured together, the intermediate portion of the spring leaf construction engaging the inside of the bolster between its ends and the extreme ends of the leaf spring construction extended into and carried by the spring seats below the coiled springs.

HARLEY E. ANDERSON.